(No Model.)
3 Sheets—Sheet 1.
B. B. WARD.
DUPLEX ELECTRIC ARC LAMP.
No. 492,124.
Patented Feb. 21, 1893.
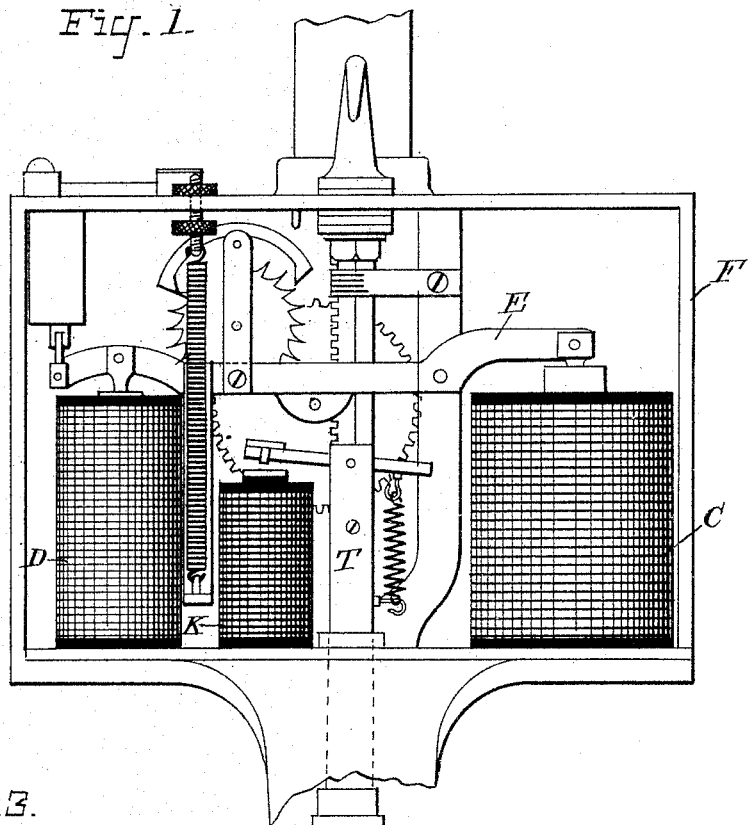
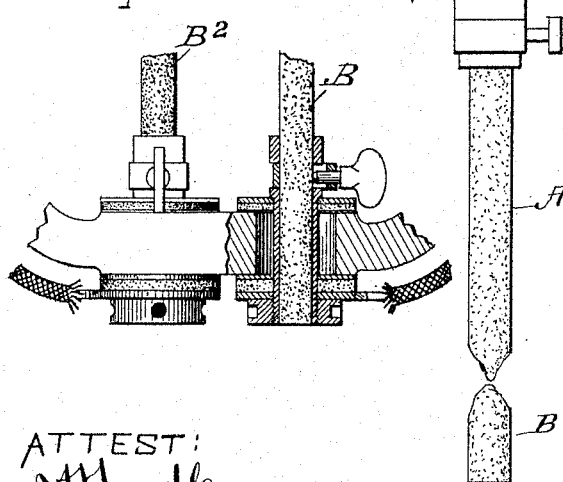
ATTEST:
J. H. Hurdle
Wm. N. Capel.
INVENTOR:
Barton B. Ward
By H. C. Townsend
Attorney

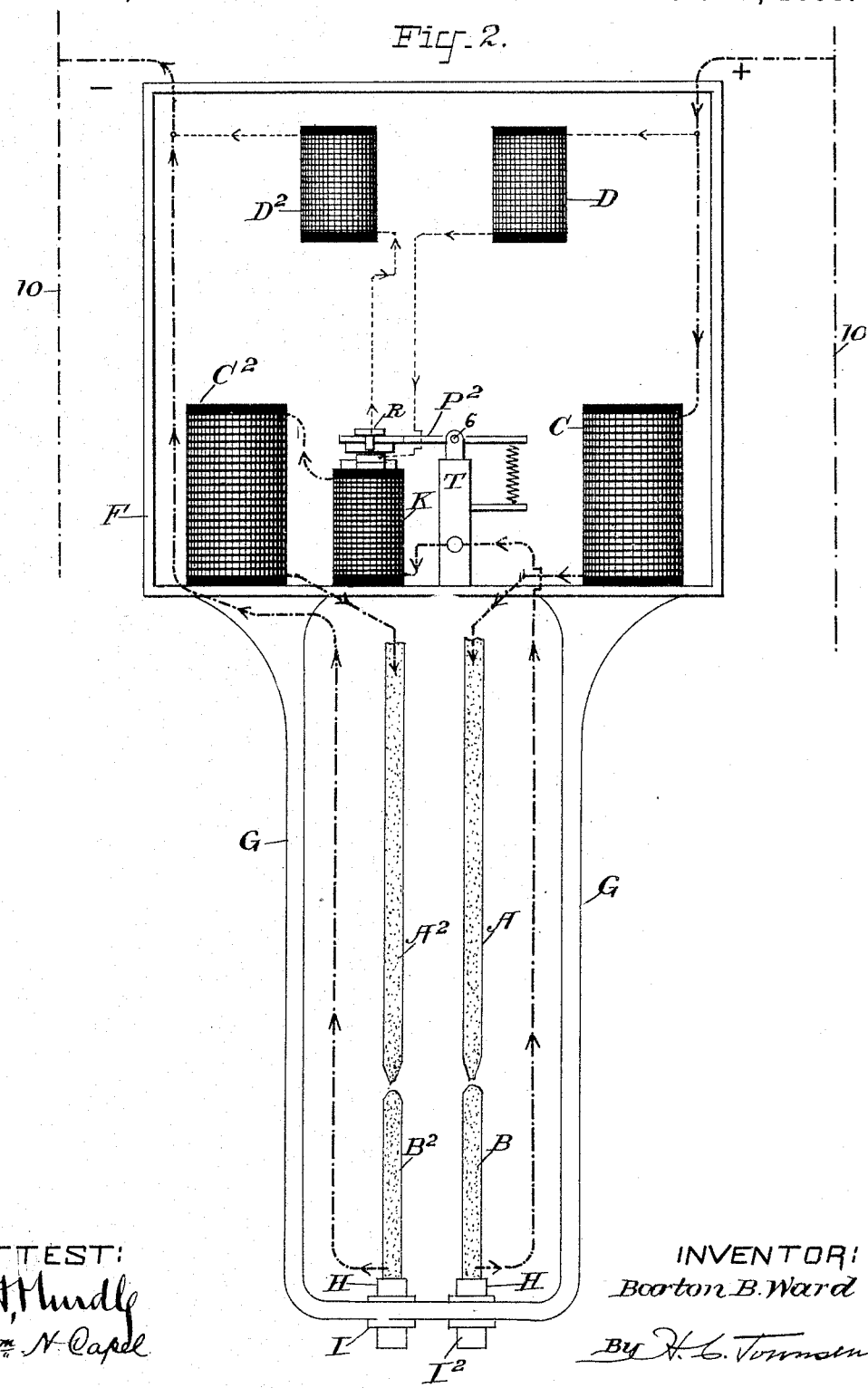

(No Model.) 3 Sheets—Sheet 3.
B. B. WARD.
DUPLEX ELECTRIC ARC LAMP.
No. 492,124. Patented Feb. 21, 1893.
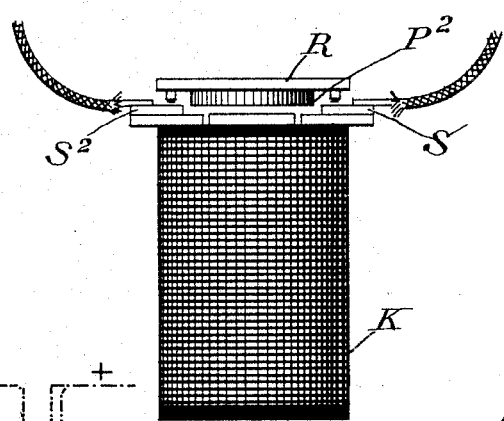
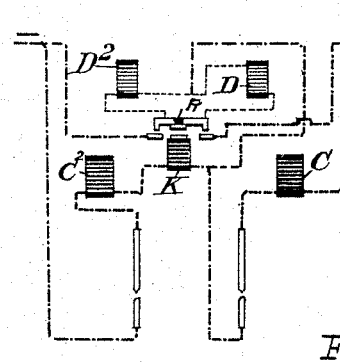
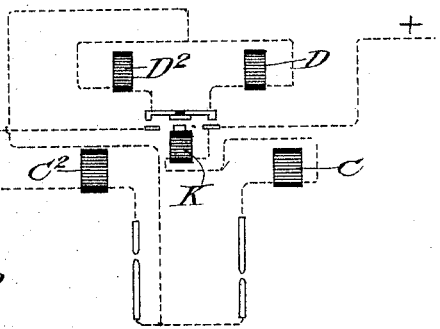
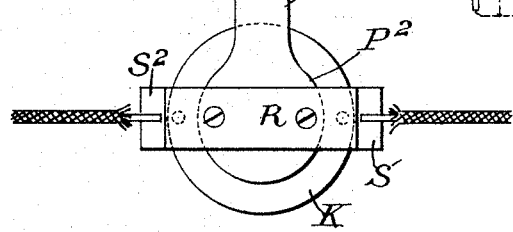
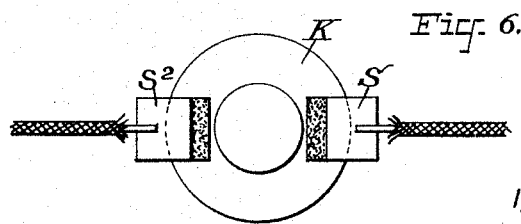
ATTEST:
J. A. Hurdle
Wm. N. Capel.
INVENTOR:
Barton B. Ward
By H. L. Townsend
Attorney

UNITED STATES PATENT OFFICE.

BARTON B. WARD, OF NEW YORK, N. Y.

DUPLEX ELECTRIC-ARC LAMP.

SPECIFICATION forming part of Letters Patent No. 492,124, dated February 21, 1893.

Application filed May 17, 1892. Serial No. 433,309. (No model.)

*To all whom it may concern:*

Be it known that I, BARTON B. WARD, a citizen of the Dominion of Canada, and a resident of New York, in the county of New York and State of New York, have invented a certain new and useful Electric-Arc Lamp, of which the following is a specification.

My invention relates to electric arc lamps designed for use on what are termed constant potential circuits between whose mains incandescent lamps or other translating devices are connected in parallel while an approximately constant difference of potential is maintained between the mains. This difference of potential is usually considerably greater than that required to maintain the arc of a single electric arc lamp, and it hence becomes necessary in burning arc lamps on such circuits to either run two or more arc lamps in series with one another in each branch or connection across the mains, or else, when a lesser number is run, to cut down the surplus potential by an interposed useless and wasteful resistance.

In describing my invention I will assume that the potential of the mains is one hundred to one hundred and ten volts, the standard at present in use for incandescent lamp circuits. It will be understood, however, that the invention is applicable to circuits of greater potential or even less provided the potential is in any case sufficient to maintain two arcs at least. A standard arc lamp as ordinarily run is designed to pass approximately eight to ten ampères of current, and the voltage for maintaining the arc of the ordinary length is approximately one half that provided by the mains. Hence it is the practice to run two lamps each giving the standard illumination in the same branch, but when the standard illumination of one lamp only is desired it is necessary to interpose an artificial resistance in the branch with the lamp.

One of the aims of my invention is to provide a lamp that may be used on such a constant potential circuit as an efficient and economical substitute for the ordinary lamp giving the standard light, but without the use of any considerable dead resistance taking the place of a second lamp burned in the same branch.

Briefly speaking my invention consists of a double or multiple arc lamp having two or more independent regulating mechanisms, and two or more corresponding feed controlling magnet systems in continuous operative connection with the electric circuit. A lamp thus constructed and run on a one hundred and ten volt circuit could be made to pass say four or five ampères of current through each of its two sets of carbons constantly burning in series, and would then give as much or even more light than a single eight to ten ampère lamp, and could hence be used as an economical substitute for a single lamp giving the standard illumination, since the two arcs would substantially use up the whole voltage and wasteful resistance would be unnecessary.

Another advantage of a lamp constructed in accordance with my invention is that the light produced for a given consumption of electric energy would be better distributed. The lamp also permits of the simultaneous burning of two sets of carbons in reversed connection that is with the lower carbon of one pair used as a positive while the upper of the other pair is used at the same time as a positive. Hence my invention provides a lamp especially suited to photo-engraving or other purposes where a more uniform distribution of the light is desired than could be obtained by a lamp in which a single crater exists throwing the light mainly in one direction only. When the voltage permits it will be obvious that the lamp might have a larger number than two sets of carbons and feed mechanisms operating at the same time, and that if desired the lamp might be made to consume only the normal amount of energy and give only the illumination of a standard lamp, by constructing it to pass a correspondingly less number of ampères.

Other novel features of my invention will be more particularly specified in the claims.

In the drawings I have illustrated my invention as embodied in a double carbon lamp.

In Figure 1, of the drawings, the lamp is shown from one side in elevation. Fig. 2, is a diagrammatic front elevation showing the two sets of carbons and the two corresponding sets of regulating magnets together with a switch magnet which is combined with said two sets and employed in the manner hereinafter described. Fig. 3, is a vertical section through the lower end of the frame of the lamp where the two lower carbons are supported. Fig. 4, shows the switch magnet in elevation. Fig. 5, is a plan of the armature used with said magnet. Fig. 6, is a plan of the magnet itself with the contacts supported thereon. Fig. 7, illustrates a modification of the connections. Fig. 8, illustrates a modification of the manner of operating the lamp. Fig. 1, shows the mechanism for one pair of carbons. A view of the lamp from the opposite side would be substantially the same with the switch magnet omitted.

A, B, indicate one pair of carbons and $A^2$, $B^2$, a second pair.

C, is the main circuit regulating magnet for the first pair and D, the derived circuit magnet for the same pair. While I have shown two regulating magnets (main and derived) for controlling the feed of the carbons in the usual manner, I do not limit myself to the use of magnets combined in the particular way herein shown. The said magnets, as indicated, are provided with movable cores attached to opposite ends of the feed regulating lever E, which supports the usual mechanism gearing with the carbon carrier and adapted to lift the carbon or permit it to feed down according to the requirements. The feed mechanism here shown is the ordinary clock-work feed and need not be described in detail since any other clock-work feed or any other regulating device may be used in place thereof.

The mechanism for the two pairs of carbons may be substantially the same or may vary as desired. The mechanism of each pair is properly mounted on an insulating support or base in the frame F, of the lamp and the electric connections are formed with the upper and lower carbons through the frame and the regulating mechanisms and by the attachment of proper conductors, as well understood in the art.

Main and derived circuit magnets for the second pair of carbons $A^2$, $B^2$, are indicated at $C^2$, $D^2$, in the diagram Fig. 2.

The side rods of the lamp, indicated at G, support at their lower end in the proper cross pieces, the two lower carbon holders H, H. These holders are mounted in the cross bar in the manner indicated in Fig. 3. They are insulated from one another in proper bushings, as shown, of insulating material secured in openings in the cross frame and are fastened in place therein by suitable nuts I, which engage with the lower ends of the tubular carbon holders beneath the cross frame. These metal nuts may also serve to clamp plates $I^2$, which are secured to the ends of conductors by which proper connections are made with the lower carbon holders. By thus mounting the lower carbon holders and making proper connections with the same, the two sets of carbons may be included in series with one another as indicated by the diagram and as will be presently described.

K, indicates a switch magnet which is included in the series circuit with the two carbons and normally holds closed a switch having two sets of contacts that normally complete the circuit for the derived magnets D, $D^2$, putting each derived circuit magnet into proper shunt connection with its own or corresponding pair of carbons. When the circuit is interrupted through the carbons, however, the switch magnet K, loses its power and the connection of both magnets D, $D^2$, with the circuits of the lamp is interrupted so that no current may pass through them when the lamp is out of operation. The switch by which this is accomplished may be constructed as illustrated in the detail figures.

The armature lever of the magnet K, is indicated at P, and is pivoted rather loosely at the point 6, being provided, however, with a proper retracting spring which tends to hold the armature $P^2$, away from the pole of the magnet K. The armature supports the cross piece of conducting material indicated at R, which, at its opposite sides, carries contact points adapted to engage with contact plates S, $S^2$, which are properly mounted on a plate of insulating material on the top of the magnet so as to be out of connection with one another excepting through the connecting switch plate R, and the switch contacts carried thereby. The plates or contacts S, $S^2$, connect respectively with one terminal of the derived circuit magnet coils D, $D^2$, the opposite terminals thereof being connected as shown in the diagram with the two terminals of the lamp in any proper manner. The switch bar or connector R, is in electrical connection with the armature lever itself and the latter is properly mounted on a post T, and in electrical connection therewith.

Suitable attachments of the wires of the lamps are made, as shown, in the diagram Fig. 2, so as to form the connections therein illustrated. Starting from one terminal of the lamp indicated by the sign positive the main circuit passes through the magnet C, and through the pair of carbons A, B, to the post T, at which point connection exists with one terminal of the derived circuit magnet D, for the set of carbons A, B, when the switch lever is pulled down by means of a magnet K; the main circuit continues by way of the coils of K, through the main circuit magnet $C^2$, and by way of the second pair of carbons $A^2$, $B^2$, to the terminal of the lamp marked negative. The connection of the derived circuit magnet $D^2$, for such second pair is formed through the switch R, when the armature lever $P^2$, is drawn down so that the same will be in derived circuit to said second pair. The attachment of the two derived circuit magnets D, $D^2$, to the terminals of the lamp are obvious from inspection.

When the lamp is in operation the main circuit magnet K, being excited by the current passing through the two pairs of carbons, holds down the armature lever $P^2$, and closes the two switch contacts at the opposite ends of the bar R, on the contacts S, S², the lamp being then in operative condition so far as all of the circuits are concerned and each of the derived circuit magnets D, D², operating in conjunction with its own main circuit magnet C or C², and its own pair of carbons, in proper manner to permit the two pairs of carbons to burn and adjust themselves, as well understood in the art. If, however, the main circuit becomes interrupted through burning out of the carbons then the magnet K, loses its power and the connection of both derived circuit magnets D, D², with the circuit of the lamp is interrupted so that current may not pass through either of them while the lamp is out of operation.

It will be obvious that instead of placing the switches for the two magnets D, D², at the point indicated between such magnets, they might be interposed in the circuit between the magnets D, D², and the terminals of the lamp. This modification I have illustrated by the detail diagram Fig. 7. In this instance, however, it will be necessary to insulate the two ends of the cross bar R, from one another, as shown, and to make connection with said ends and with the terminals of the lamp or with the magnets D, D², in circuit.

In the diagram Fig. 2, the constant potential mains are indicated by the numerals 10, 10.

Should it be desired to burn the two pairs of carbons with the upper of one pair as a positive, while the lower of the other is a positive, it is obviously only necessary to change the connections so as to reverse the direction of the flow of current through one pair as heretofore traced and as indicated in the diagram Fig. 8.

What I claim as my invention is—

1. A multiple carbon lamp having two or more independent regulating mechanisms and corresponding simultaneously burning pairs of carbons, two or more corresponding feed controlling magnet systems in continuous operative connection with the electric circuit, and a frame common to said pairs of carbons and magnet systems, as and for the purpose described.

2. A double or multiple carbon lamp having a frame F, G, G, two or more sets of carbons burning simultaneously in series with one another, with the lower carbons both supported in the cross piece of the side rods G, G, two or more corresponding independently operating regulating mechanisms for said carbons, and two or more corresponding feed controlling magnet systems in continuous operative connection with the electric circuit and mounted in the frame F, as and for the purpose described.

3. In a double carbon lamp, the combination, substantially as described, with the two simultaneously burning pairs of carbons and the two corresponding sets of main and derived circuit regulating magnets in continued operative connection with the circuit, of switch devices by which the operative connection of each derived circuit magnet in the lamp is normally maintained, and a magnet in the main circuit with the two pairs of carbons for holding the two sets of contacts of said switch devices normally closed.

4. The combination with constant potential mains, of an electric arc lamp having the voltage of the mains subdivided in a number of pairs of simultaneously but independently fed and adjusted pairs of carbons run in series with one another, and corresponding in number to the voltage or potential, the lower carbons of said pairs being mounted in a cross bar of the side rods of the lamp and insulated from one another on said cross bar, as and for the purpose described.

Signed at New York, in the county of New York and State of New York, this 14th day of May, A. D. 1892.

BARTON B. WARD.

Witnesses:
WM. H. CAPEL,
THOS. F. CONREY.